Dec. 15, 1931.  G. B. SCHEIBELL  1,836,284
FLUID FLOW CIRCUIT CONTROLLER
Filed Oct. 21, 1929  2 Sheets-Sheet 1
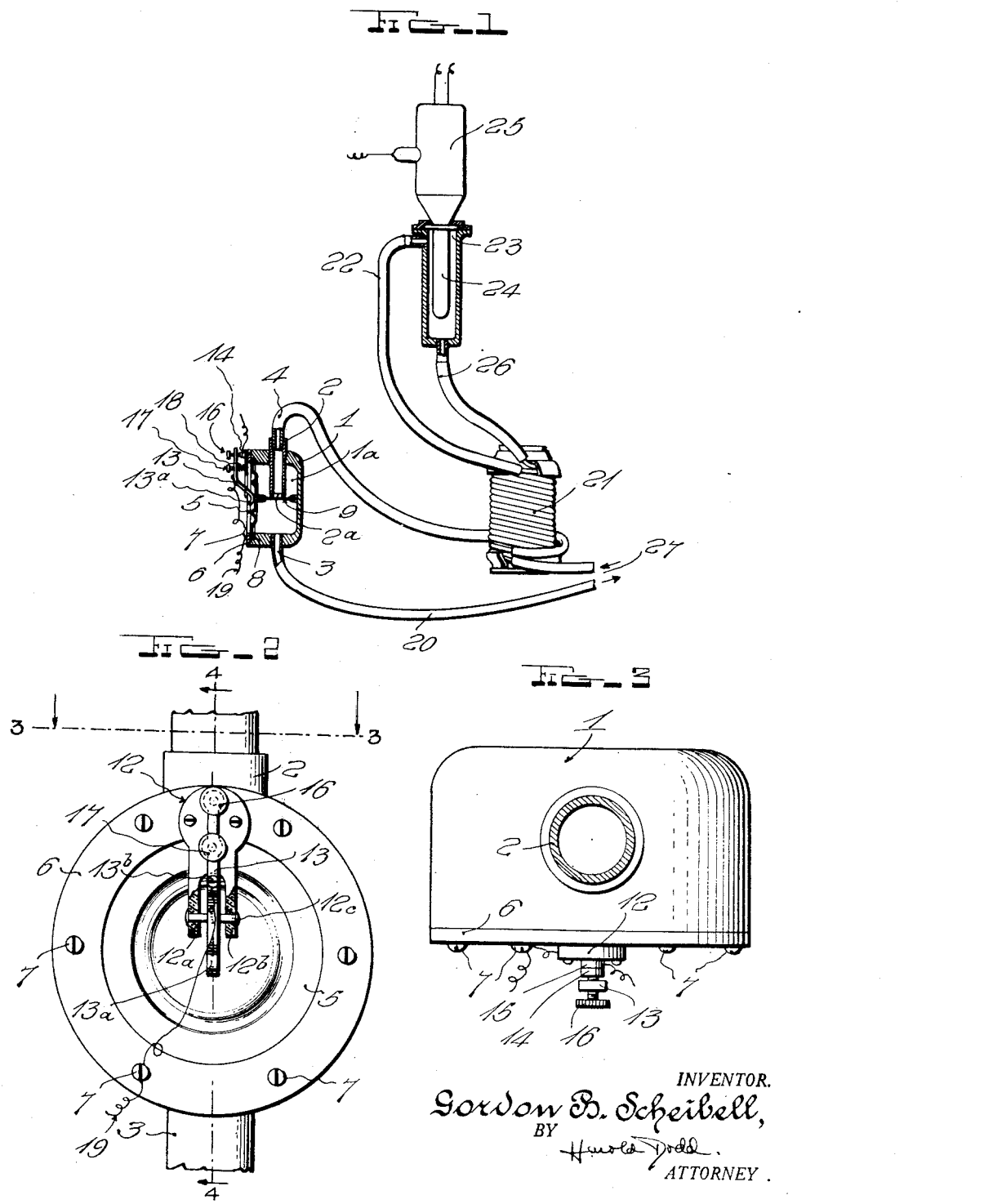
INVENTOR.
Gordon B. Scheibell,
BY
Harold Todd
ATTORNEY.

Dec. 15, 1931.   G. B. SCHEIBELL   1,836,284
FLUID FLOW CIRCUIT CONTROLLER
Filed Oct. 21, 1929    2 Sheets-Sheet 2
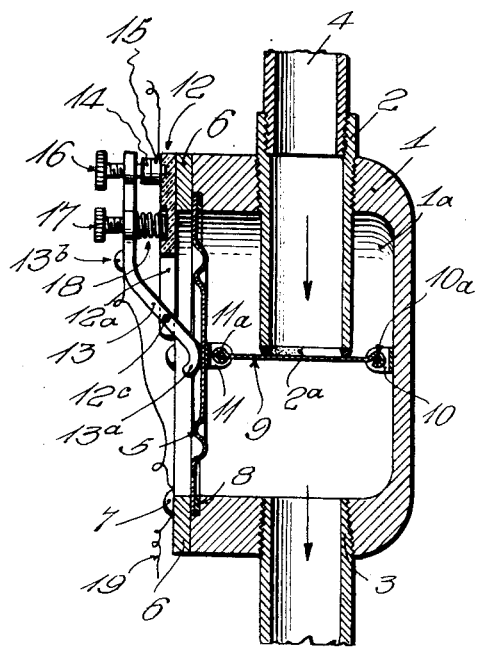
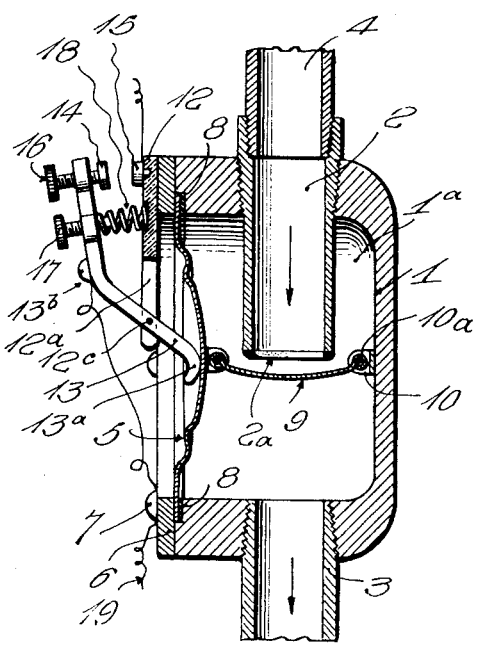
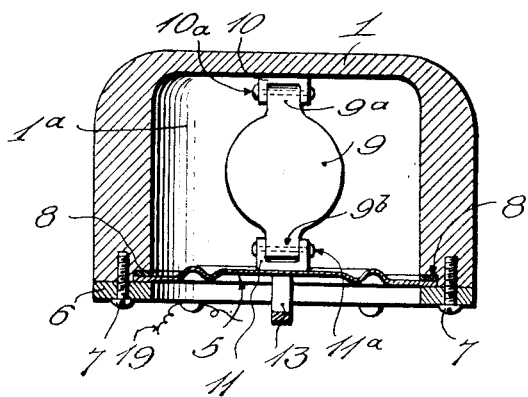
INVENTOR.
Gordon B. Scheibell,
BY Harold Todd.
ATTORNEY.

Patented Dec. 15, 1931

1,836,284

UNITED STATES PATENT OFFICE

GORDON BROWN SCHEIBELL, OF FRIENDSHIP HEIGHTS, MARYLAND

FLUID FLOW CIRCUIT CONTROLLER

Application filed October 21, 1929. Serial No. 401,331.

My invention relates broadly to circuit controllers which are operated in accordance with the condition of flow of fluid and more particularly to an adjustable contact device which may be regulated in accordance with the passage of fluid through a pipe line.

One of the objects of my invention is to provide a construction of circuit controller which is simple in its construction and efficient in operation by response to changes in the flow of fluid with minimum inertia for actuating an electrical contact system and controlling an electrical circuit in accordance with the flow of fluid through a pipe line.

Another object of my invention is to provide a construction of fluid circulation controller which may be interposed in a pipe line and controlled by the passage of fluid through the pipe line for operating an electrical circuit for the control of apparatus which insures the constant circulation of fluid through a pipe line system.

Still another object of my invention is to provide a circuit controller which operates in accordance with the circulation of fluid through a pipe line system where an electrical contact may be maintained in closed position when the circulation of fluid is reduced below a predetermined minimum while the contact is opened so long as a predetermined circulation of fluid may be maintained through an associated pipe line system.

Other and further objects of my invention reside in the construction of an electrical controller which is operated in accordance with the circulation of fluid as will be more fully set forth in the specification hereinafter following by reference to the accompanying drawings, in which:

Figure 1 illustrates the circuit controller of my invention in one of its applications assuring the constant flow of cooling fluid so long as a high power tube in a radio transmission system is in operation, which tube is shut down upon failure of the cooling fluid supply; Fig. 2 is a front elevation of the circuit controller of my invention with a portion of the member which pivotally supports the operating lever broken away and shown in cross-section; Fig. 3 is a plan view of the circuit controller with the fluid supply pipe shown in cross-section on line 3—3 of Fig. 2; Fig. 4 is a longitudinal cross-sectional view taken through the circuit controller of my invention on line 4—4 of Fig. 2 and illustrating the contactor in closed position; Fig. 5 is a cross-sectional view corresponding to the view shown in Fig. 4 but illustrating the contactor of the circuit controller in actuated position with the contactor open; and Fig. 6 is a lateral cross-sectional view taken through the casing of the circuit controller and illustrating the connection of the pressure actuating member with the diaphragm in the circuit controller of my invention.

My invention is particularly adapted for protecting high power electron tubes in a radio transmitter against the failure of the cooling fluid supply for the fluid cooled anodes of the high power tubes. While the high power tubes are in operation the anode, under bombardment of electrons from the cathode, is elevated to relatively high temperatures and it is essential that constant circulation of cooling fluid be maintained to prevent excessive temperatures at the tube anodes. An indicator mounted in the fluid flow line and actuated by line pressure cannot be depended upon for indicating the actual flow of fluid or failure of fluid circulation. The failure of fluid circulation in a high power tube system is too disastrous to be left to the human element, and to require the continuous observation of an indicator. By my invention I have produced a construction of automatic fluid flow circuit controller which opens the circuit to a relay system when a predetermined circulation of fluid has been established and maintains the relay circuit open and the circuit to a high power tube system closed for the normal operation of the tube system. However, upon failure of the fluid circulation a contact member is automatically closed which closes the associated relay circuit and opens the circuit to the high power tube system thereby shutting down the high power tube when the fluid is not circulating around the anode system. My invention resides in the construction of a fluid flow circuit controller by which operation of a relay circuit in accordance with the circulation of fluid through the fluid controlling system, without time delay or inertia, may be effected so that the tube may be shut down immediately upon failure of circulation in the cooling system.

Referring to the drawings in more detail, reference character 1 designates a housing which encloses the parts of the circuit controller of my invention. A fitting 2 extends into the chamber 1a within the housing 1, through which fluid enters from the cooling system through pipe line 4. The fluid is discharged from the chamber 1a through outlet 3 from which the fluid passes through pipe line 20 to the fluid circulating system which includes the cooling coil system 21 from which cooling fluid is supplied through pipe line 22 to the upper portion of the jacket 23 which surrounds the anode 24 of high power tube 25. The fluid is discharged from jacket 23 through pipe line 26, again passing through cooling coil 21 and pipe line 4 to the fitting 2 in the housing 1. The fluid is supplied from any suitable source to which the pipe lines 20 and 27 may extend, with a suitable pump positioned in the line for maintaining the circulation of fluid through the cooling system.

A diaphragm 5 of resilient material is mounted across one side of chamber 1a by means of a clamping ring 6 secured by screws 7 to the housing 1. A resilient packing 8 is provided beneath the diaphragm 5 and maintains a fluid tight chamber and prevents leakage from the chamber. The diaphragm 5 is provided with concentric annular corrugations which permit the diaphragm to be deformed under conditions of fluid circulation in the chamber 1a. A plate member 9 of resilient material is suspended across the orifice or terminus of the fitting 2 by means of bracket members 10 and 11, the bracket member 10 being secured to the rear wall of the chamber 1a and the bracket member 11 being secured to the back of the resilient diaphragm 5, respectively. The ends of member 9 are narrowed in the form of tongues 9a and 9b and are wrapped around pins 11a and 10a which are secured in the brackets 10 and 11. The member 9 is therefore coupled to the diaphragm 5 and when in a normal position will extend in a plane laterally across the orifice or terminus of fitting 2 and provide a fluid tight seal therewith against gasket 2a which is carried in the end of fitting 2.

An insulated member 12 is suitably secured to the face of clamping ring 6 and chamber 1 and extends over the diaphragm 5 as shown in Figs. 2, 4 and 5. The member 12 is bifurcated and has arms 12a and 12b as shown between which pin 12c extends to provide a pivotal mounting for arm 13. One end of arm 13 establishes movable contact with diaphragm 5 as indicated at 13a. The other end of arm 13 carries a contact member 14 which is aligned with fixed contact 15 mounted on insulated member 12. Spring 18 is disposed between the arm 13 and the insulated member 12, thus exerting a continuous force against arm 13 so that this arm follows the diaphragm 5. Thumb screws 16 and 17 are provided for adjusting the position of contact 14 and the tension of spring 18. Electrical connections are taken from fixed contact 15 and from adjustable contact 14 through arm 13, and connecting screw 13b to one of the fastening screws 7, under which a suitable lug may be secured for establishing connection through conductor 19.

When there is no flow through the pipe line 3—4 the member 9 extends laterally across the orifice 2 and is perpendicularly coupled to the diaphragm 5. In this position the arm 13 will bring the contact 14 adjacent to the contact 15 thereby completing the relay circuit which will maintain the power circuits to the electron tube open. When fluid is caused to flow through the pipe 4 into the fitting 2, the member 9 is forced away from the orifice and subsequently deforms the diaphragm 5 in such manner that the arm 13 lifts the contact 14 away from contact 15 thereby breaking the electrical circuit. Stoppage of flow at any point in the cooling system will allow the member 9 to assume its normal position and allow the diaphragm 5 to return to its normal position and close contacts 14 and 15. The contacts may be adjusted so that the electrical circuit will be closed at any predetermined point of retardation of flow. In the event that stoppage should occur below the housing 1 in pipe line 3 the back pressure against resilient diaphragm 5 tends to close the contacts at 14—15 and thus shut down the high power tube system.

While I have described my invention in one of its preferred embodiments I desire that it be understood that modifications may be made and that no limitations upon my invention are intended other than are imposed by the scope of the appended claims.

What I claim as new and desire to secure by Letters Patent of the United States is as follows:

1. In a fluid flow circuit controller, a chamber, an inlet orifice disposed in one end of said chamber, a fluid supply line connected to said inlet orifice, a fluid discharge pipe connected with said chamber, a resilient diaphragm closing one side of said chamber, a circuit controlling contact member operative by movement of said diaphragm, and means extending across said chamber and secured at one end to one side thereof and to the other end to said diaphragm, said means normally closing said orifice and operative upon the passage of fluid through said orifice for displacing said diaphragm for actuating said contact member.

2. In a fluid flow circuit controller, a chamber, a pipe line for introducing fluid into said chamber, a pipe line for discharging fluid from said chamber, said first mentioned pipe line having an extension projecting to the interior of said chamber, a diaphragm closing one side of said chamber, a plate member connected with said diaphragm and extending to one of the interior walls of said chamber, said plate member normally closing the interior projection of said first mentioned pipe line and deformable by the passage of fluid through said chamber, and a contact system controlled by the position of said diaphragm.

3. In a fluid flow circuit controller, a chamber, a fluid inlet connected to one end of said chamber, a fluid outlet disposed in the opposite end of said chamber, a resilient diaphragm forming one wall of said chamber, a circuit contactor positioned exteriorly of said chamber and controlled by the movement of said diaphragm, and means connected at one end to said chamber and at the other end to said diaphragm and extending interiorly of said chamber and displaceable in accordance with the passage of fluid through said chamber for controlling the position of said contact system.

4. In a fluid flow circuit controller, a chamber for the passage of fluid, an orifice secured in one side of said chamber, a liquid supply pipe connected to said orifice, a discharge pipe connected to the opposite side of said chamber, a resilient diaphragm forming a closure for one side of said chamber, said diaphragm being deformable in the direction of the interior of said chamber, means extending laterally across said chamber and suspended between one wall thereof and said diaphragm for normally closing said orifice, said means being movable out of position by the passage of fluid through said orifice in the direction of said discharge pipe, and an electrical contactor controlled by the movement of said diaphragm in accordance with the flow of fluid through said chamber.

5. In a fluid flow circuit controller, a chamber, an orifice extending into one side of said chamber, a fluid supply pipe connected to said orifice, a discharge pipe connected to said chamber, a resilient diaphragm forming a closure for one side of said chamber, means connected with said diaphragm for normally closing said orifice, said means being deformable out of position by the passage of fluid through said orifice for deforming the position of said diaphragm, and an electrical contactor controlled by the deformation of said diaphragm.

6. In a fluid flow circuit controller, a chamber, an orifice extending into one side of said chamber, a liquid supply pipe connected with said orifice, a discharge pipe connected to said chamber, a diaphragm forming a closure for one side of said chamber, an electric circuit controller mounted on said chamber and actuated by said diaphragm, and a resilient plate member connected at one end to said chamber and at the opposite end to said diaphragm, said plate member being mounted opposite said orifice and controllable by the passage of fluid through said orifice for controlling the position of said diaphragm and correspondingly controlling the condition of said circuit controller.

7. In a fluid flow circuit controller, a chamber, an orifice positioned in one side of said chamber, a fluid supply pipe connected to said orifice, a fluid discharge pipe connected to said chamber, a resilient diaphragm closing one side of said chamber, a resilient plate member adjacent said orifice and connected at one end with said chamber and at the other end with one side of said diaphragm for effecting movement of said diaphragm in accordance with the passage of fluid through said orifice, a circuit controller carried by said chamber, said circuit controller including a spring pressed lever engaging said diaphragm, a contact system actuated by said lever, and spring means urging said lever into engagement with said diaphragm, whereby said lever moves in proportion to the movement of said diaphragm for controlling said contact system.

8. In a fluid flow circuit controller, a chamber, an orifice positioned in one side of said chamber, a fluid supply pipe connected to said orifice, a fluid discharge pipe connected to said chamber, a resilient diaphragm closing one side of said chamber, a plate member adjacent said orifice and connected at one end with said chamber and at the other end with one side of said diaphragm for effecting movement of said diaphragm in accordance with the passage of fluid through said orifice, an insulated bifurcated strip secured to said chamber, a lever pivotally mounted in said bifurcated strip and carrying a contact on one end and engaging said diaphragm at the opposite end, a fixed contact on said insulated strip aligned with the contact carried by said lever, and spring means for continuously urging said contacts to open position, the position of said lever being directly controlled by movement of said diaphragm in accordance with the passage of fluid through said orifice.

GORDON BROWN SCHEIBELL.